Patented Mar. 18, 1941

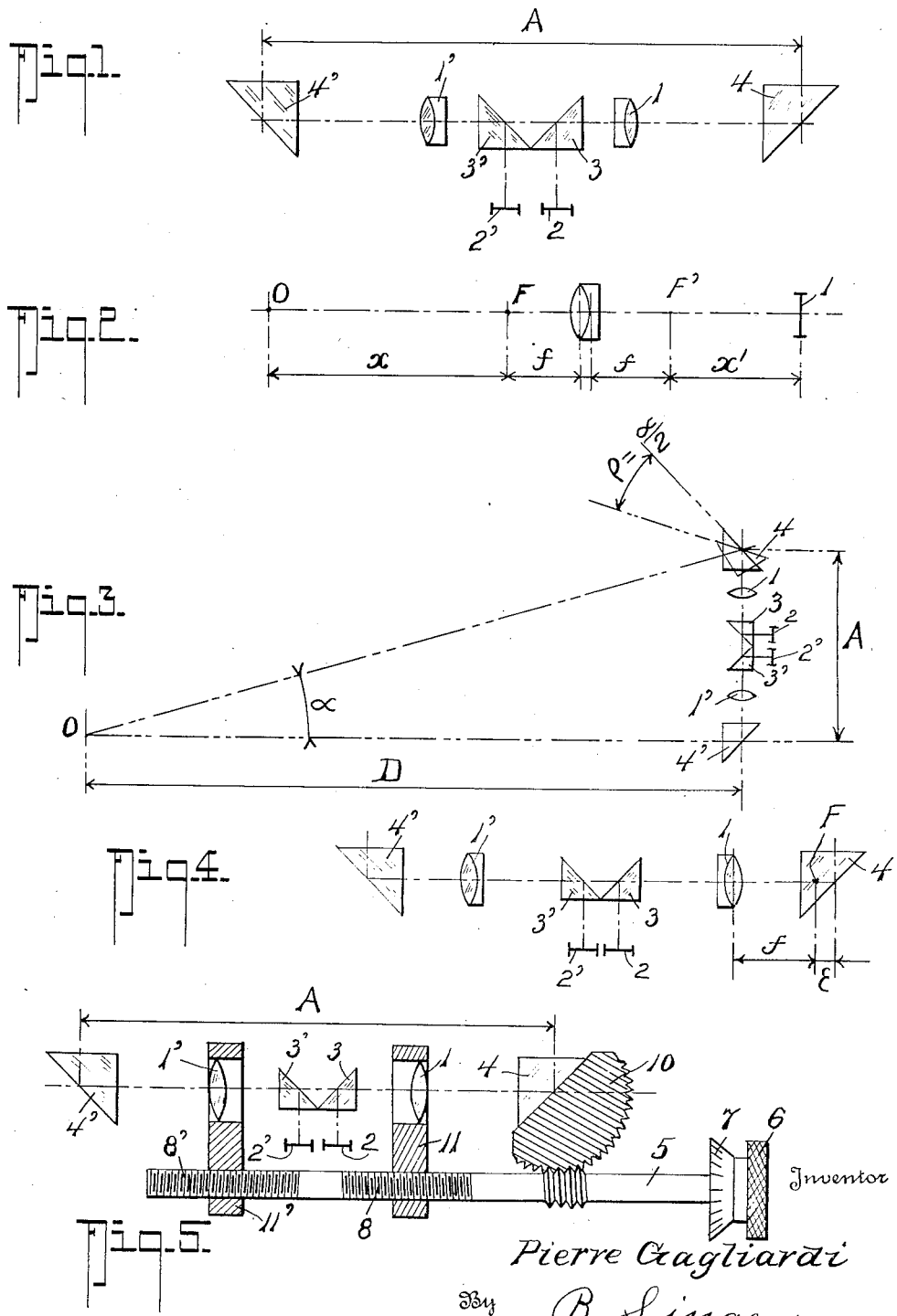

2,235,743

UNITED STATES PATENT OFFICE 2,235,743

APPARATUS FOR TAKING STEREOSCOPIC PICTURES

Pierre Gagliardi, Paris, France, assignor to Etablissements Emel S. A. R. L., Paris, France, a corporation of France Application February 9, 1939, Serial No. 255,399½
In France February 9, 1938

3 Claims. (Cl. 95—18)

The chief difficulty to be overcome when taking stereoscopic pictures lies in the variation of the parallaxes in accordance with the distance, that is to say in the concomitant variation, as a function of the distance from the object to be photographed, of the focussing and of the convergence of the two objectives.

It has already been suggested, in order to obviate this drawback, simultaneously to correct the parallax and the focussing as a function of the distance from the object.

The object of the present invention is to provide a particularly simple device for carrying out this simultaneous correction.

According to an essential feature of the present invention, the optical apparatus includes two objectives or lenses disposed in alignment with respect to each other, and four prisms arranged two by two, respectively ahead of, and behind, said lenses, respectively, at least one of the front prisms being adapted to pivot about an axis perpendicular to the common axis of the two lenses.

Other features of the present invention will result from the following detailed description of a specific embodiment thereof.

Preferred embodiments of the present invention will be hereinafter described with reference to the accompanying drawing, given merely by way of example, and in which:

Fig. 1 diagrammatically shows an optical arrangement for the taking of stereoscopic pictures;

Figs. 2, 3 and 4 illustrate the geometrical conditions with which the apparatus according to the invention is to comply;

Fig. 5 is a diagrammatical view illustrating the principle of the invention.

An apparatus for taking stereoscopic pictures, either for photographs or for moving pictures, essentially comprises, as shown by Fig. 1, two lenses having exactly identical focal lengths, 1, 1', two images either on a single or on two films 2, 2', two 45° prisms, 3, 3', arranged ahead of the films, and the two 45° prisms 4—4¹ separated from each other by a distance B, this length being measured along the optical axis of the two lenses 1—1¹ between the points of intersection of this axis and the reflecting surfaces of the two prisms 4 and 4¹; this distance is substantially equal, for practical purposes, to 64 millimeters, that is to say the average distance between the optical axes of human eyes. The distance A is that between the points where the foci of the lenses 1' and 1 respectively lie in the prisms 4' and 4.

On the other hand, the focal length of the lenses is substantially equal to 24 (focal length of the human eye) in order to remain within conditions corresponding to direct vision.

It is known (Fig. 2) that, in order to ensure a correct focussing, the film on which the image is formed must be located at a distance $x'$ from the corresponding focus F' depending upon the distance $x$ from the object O to the focus F and upon the focal length $f$ of the lens according to the following formula:

$$x' = \frac{f^2}{x}$$

On the other hand, in order to ensure the convergence of the two optical axes of the apparatus toward the object, it is necessary, supposing prism 4' to be fixed in position, to rotate (Fig. 3) prism 4 through an angle $p$ equal to $$\frac{\alpha}{2}$$

such that $p$ is equal to $$\frac{A}{2D}$$

in which formula D designates the distance from the object O to prism 4'.

For practical purposes, the focus F is located in prism 4 (Fig. 4), in such manner that D is equal to $x+\epsilon$ ($\epsilon$ being practically negligible), and, in the above formula, D can be considered as equal to $x$, so that $p$ is equal to $$\frac{A}{2x}$$

On the other hand, $x'$ is given by the formula $$x' = \frac{f^2}{x}$$

It follows that $x'$, which measures the value of the focussing adjustment, and $p$, which measures the value of the parallax adjustment, both depend upon the value of $x$, that is to say of the distance from the object to the apparatus.

It will be readily understood that it is possible, through a suitable mechanical control, simultaneously and correspondingly to adjust, by means of a single operating member, both the focussing and the parallax.

Fig. 5 diagrammatically shows the adjusting device provided for this purpose. The system illustrated by this figure is constituted by a spindle 5 having a milled head 6, and a drum or vernier 7, on which are mounted three screw elements 8, 8' and 9.

Elements 8 and 8' have their threads in opposed directions (respectively right hand threads and left hand threads), and they correspond to threaded portions 11 and 11' of the lenses 1 and 1' with which they cooperate. The rotation of spindle 5 in one direction or the other therefore produces displacements of lenses 1 and 1' of the same amplitude but in opposite directions, respectively, for effecting the focussing.

Screw element 9 cooperates with a toothed sector 10 for modifying the inclination of prism 4. The reduction ratio of screws 8—8', on the one hand, and screw 9, on the other hand, will be calculated in such manner as to comply with the two formulas given above for the values of $x$ and $p$ as a function of $x$, and the desired result will be obtained, to wit the focussing adjustment and the parallax adjustment will be obtained simultaneously by operating a single knob 6.

Of course, the device which has just been described is given merely by way of example and may correspond to different embodiments. On the other hand, the transmission mechanism, itself, as illustrated by Fig. 5, is given also merely by way of example.

Finally, it should be noted that the invention is applicable to stereoscopic apparatus of all kinds, and, in particular, the prisms might, in the known manner, be replaced by mirrors, while the lenses might occupy one of the three known positions, to wit, that shown by the drawing, or ahead of prisms 4—4', or behind prisms 3—3'.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. In combination, in an apparatus for forming stereoscopic images on at least one film, two lenses of the same focal length arranged in line with each other, two pairs of reflecting prisms, each pair being associated with one of said lenses for directing the light beam passing therethrough onto said film and including one prism located ahead of said one of said lenses and one located behind, at least one of said prisms being pivotable, for parallax correction, about an axis at right angles to the common axis of said two lenses, mountings for said respective lenses including internally threaded portions with their threads in opposed directions, respectively, a threaded rod with right and left threads engaged in said threaded portions, respectively, means for controlling the pivoting movement of said last mentioned prism, operatively connected with said threaded rod, and means for turning said threaded rod about its own axis.

2. In combination, in an apparatus for forming stereoscopic images on at least one film, two lenses of the same focal length arranged in line with each other, a frame for both of said lenses movably supporting them, two pairs of reflecting prisms, each pair being associated with one of said lenses for directing the light beam passing therethrough onto said film and including one prism located ahead of said one of said lenses and one located behind, at least one of said prisms being pivotable, for parallax correction, about an axis at right angles to the common axis of said two lenses, mountings for said respective lenses including internally threaded portions with their threads in opposed directions, respectively, a threaded rod parallel to the common axis of said two lenses rotatable about its own axis without any displacement in the direction of said last mentioned axis, with respect to said frame, said rod being provided with right and left threads engaged in said threaded portions of the lens mountings, respectively, a toothed sector rigid with said rotatable prism meshing with said rod, and means for turning said threaded rod about its own axis.

3. In combination, in an apparatus for forming stereoscopic images on at least one film, two lenses of the same focal length, two reflecting means, associated with each of said lenses, respectively, for directing the light beams passing through said lenses, respectively, onto said film, at least one of said reflecting means being pivotable for parallax correction, mountings for said respective lenses including internally threaded portions, respectively, with their threads in opposed directions, a threaded rod with right and left threads engaged in said threaded portions respectively, means for pivoting said last mentioned reflecting means operatively connected with said threaded rod, and means for turning said threaded rod.

PIERRE GAGLIARDI.